United States Patent
Park

(10) Patent No.: US 11,829,464 B2
(45) Date of Patent: Nov. 28, 2023

(54) APPARATUS AND METHOD FOR AUTHENTICATION OF SOFTWARE

(71) Applicant: Samsung Electronics Co., Ltd., Suwon-si (KR)

(72) Inventor: Keunyoung Park, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 124 days.

(21) Appl. No.: 17/018,237

(22) Filed: Sep. 11, 2020

(65) Prior Publication Data

US 2021/0209219 A1    Jul. 8, 2021

(30) Foreign Application Priority Data

Jan. 8, 2020  (KR) .................. 10-2020-0002691

(51) Int. Cl.
*G06F 21/00* (2013.01)
*H04L 29/06* (2006.01)
*G06F 21/44* (2013.01)
*H04L 9/14* (2006.01)
*H04L 9/32* (2006.01)

(52) U.S. Cl.
CPC ............... *G06F 21/44* (2013.01); *H04L 9/14* (2013.01); *H04L 9/3247* (2013.01)

(58) Field of Classification Search
CPC .......... G06F 21/44; H04L 9/14; H04L 9/3247
See application file for complete search history.

(56) References Cited

U.S. PATENT DOCUMENTS

| | | | |
|---|---|---|---|
| 8,443,203 B2 | 5/2013 | Park et al. | |
| 8,914,627 B2 | 12/2014 | Park et al. | |
| 9,152,794 B1 | 10/2015 | Sanders et al. | |
| 9,589,138 B2 | 3/2017 | Yao et al. | |
| 2009/0144559 A1 | 6/2009 | Lee et al. | |
| 2009/0271782 A1* | 10/2009 | Ciudad | G06F 8/60 717/176 |
| 2012/0166781 A1* | 6/2012 | de Cesare | H04N 7/162 713/1 |
| 2017/0005810 A1* | 1/2017 | Pedersen | H04L 63/062 |
| 2017/0286665 A1* | 10/2017 | Miranda | G06F 21/72 |
| 2018/0285569 A1 | 10/2018 | Spanjers | |
| 2019/0278915 A1 | 9/2019 | Kim et al. | |

* cited by examiner

*Primary Examiner* — Philip J Chea
*Assistant Examiner* — Rodman Alexander Mahmoudi
(74) *Attorney, Agent, or Firm* — Harness, Dickey & Pierce, P.L.C.

(57) ABSTRACT

A system includes processing circuitry and a system memory configured to store at least one software image. The at least one software image includes at least one program image and a keychain image associated with the at least one software image, the keychain image including at least one soft key. The processing circuitry is configured to obtain a desired soft key associated with the at least one software image from the keychain image based on key information included in the at least one software image, and authenticate the at least one software image based on the obtained soft key.

20 Claims, 15 Drawing Sheets

APPARATUS AND METHOD FOR AUTHENTICATION OF SOFTWARE

CROSS-REFERENCE TO RELATED APPLICATION

This U.S. non-provisional application claims the benefit of priority under 35 U.S.C. § 119 to Korean Patent Application No. 10-2020-0002691, filed on Jan. 8, 2020, in the Korean Intellectual Property Office, the disclosure of which is incorporated herein in its entirety by reference.

BACKGROUND

Various example embodiments of the inventive concepts relate to system security, and more particularly, to an apparatus, system, non-transitory computer readable medium, and/or method for the authentication of software.

Attacks on systems including software and hardware may be attempted in various ways. For example, attackers may disassemble the system and extract required information from the disassembled system. Also, the attackers may change at least a part of the software of the system and enable the system to perform operations intended by the attackers. Although various types of system security techniques may be adopted to protect the system or data stored in the system from advanced attacks, the system security techniques may cause overhead to the manufacture, operations, extension, and costs of the system. Accordingly, a system security technique capable of protecting the system from advanced attacks while decreasing and/or minimizing the overhead are desired and/or required.

SUMMARY

Various example embodiments of the inventive concepts provide for an apparatus, system, non-transitory computer readable medium, and/or method for safe and efficient authentication of software.

According to an aspect of at least one example embodiment of the inventive concepts, there is provided a system including a system memory configured to store at least one software image, the at least one software image comprising at least a program image and a keychain image associated with the at least one software image, the keychain image including at least one soft key. The system may further include processing circuitry configured to obtain a desired soft key associated with the at least one software image from the keychain image based on key information included in the at least one software image, and authenticate the at least one software image based on the obtained soft key.

According to another aspect of at least one example embodiment of the inventive concepts, there is provided a method of authenticating software images loaded in a system memory. The method is performed by processing circuitry. The method includes authenticating a first software image, the first software image including first key information and at least one soft key, authenticating a second software image, the second software image including second key information, the authenticating of the second software image including, obtaining the second key information from the second software image, obtaining a first soft key from the authenticated first software image based on the second key information, and verifying a digital signature of the second software image based on the first soft key.

According to another aspect of at least one example embodiment of the inventive concepts, there is provided a method of generating a signed software image to execute authentication of software in a system, the system including processing circuitry. The method includes generating a program image as the signed software image, the program image to be executed by the system, and generating a keychain image as the signed software image, the keychain image including at least one soft key, the generating the keychain image including, obtaining a first binary image, the first binary image including computer readable instructions, generating a first signature, the first signature being verified based on a first soft key, and generating a first signed program image, the first signed program image including the first binary image and the first signature.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Figure 1:
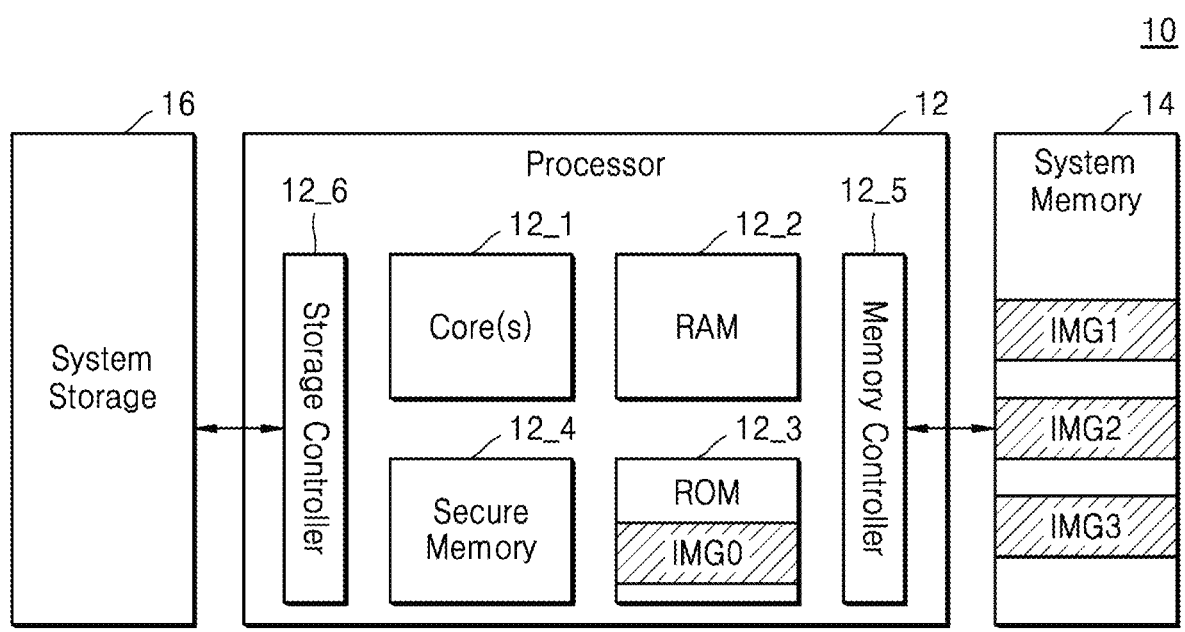
FIG. 1 is a block diagram of an example of a system according to at least one example embodiment.

FIG. 1 is a block diagram of an example of a system 10 according to at least one example embodiment. In some example embodiments, non-limiting examples of the system 10 may include a stationary computing system (e.g., a server, a desktop computer, and/or a kiosk, etc.) or a sub-system thereof. In some example embodiments, non-limiting examples of the system 10 may include a portable computing system (e.g., a mobile phone, a wearable device, a smart device, a gaming console, a tablet, and/or a laptop computer, etc.) and a sub-system thereof. In some example embodiments, non-limiting examples of the system 10 may include a sub-system included in an arbitrary system different from a standalone computing system, such as home appliances, internet of things (IoT) devices, industrial equipment, and/or transportation vehicles, etc.

Referring to FIG. 1, the system 10 may include at least one processor 12, a system memory 14, and/or a system storage 16, etc., but the example embodiments are not limited thereto. For example, in other example embodiments, there may be two or more processors, system memories, system storage devices, and/or other system components, etc. In some example embodiments, each of the processor 12, the system memory 14, and the system storage 16 may be manufactured using a semiconductor process, and at least two of the processor 12, the system memory 14, and the system storage 16 may be included in the same package. In some example embodiments, the processor 12, the system memory 14, and the system storage 16 may be mounted on a board and connected to each other through patterns formed on the board.

The processor 12 may include at least one core 12_1, random access memory (RAM) 12_2, read-only memory (ROM) 12_3, a secure memory 12_4, a memory controller 12_5, and/or a storage controller 12_6, but the example embodiments are not limited thereto. According to at least one example embodiment, the processor 12 may be referred to as processing circuitry and may include hardware such as logic circuits; a hardware/software combination such as at least one processor core executing software and/or executing any instruction set; or a combination thereof. For example, the processing circuitry more specifically may include, but is not limited to, a central processing unit (CPU), an arithmetic logic unit (ALU), a digital signal processor (DSP), a graphics processing unit (GPU), a communication process (CP), a microcomputer, a field programmable gate array (FPGA), a System-on-Chip (SoC), a programmable logic unit, a microprocessor, application-specific integrated circuit (ASIC), etc., and according to some example embodiments, may further include one or more of: interfaces, buses, memory, and/or controllers, etc. In some example embodiments, at least two of the at least one core 12_1, the random access memory (RAM) 12_2, the read-only memory (ROM) 12_3, the secure memory 12_4, the memory controller 12_5, and the storage controller 12_6 may communicate with each other. For example, the processor 12 may access the system memory 14 by using the memory controller 12_5 configured to provide an interface for accessing the system memory 14. Also, the processor 12 may access the system storage 16 by using the storage controller 12_6 configured to provide an interface for accessing the system storage 16. In some example embodiments, the processor 12 may further include at least one bus by which the at least one core 12_1, the RAM 12_2, the ROM 12_3, the secure memory 12_4, the memory controller 12_5, and/or the storage controller 12_6, or combinations or sub-combinations thereof, are connected. In some example embodiments, the processor 12 may further include a hardware accelerator designed to perform a desired and/or predefined operation at high speed and an input/output (I/O) interface configured to provide a communication channel between the processor 12 and external components thereof. In some example embodiments, components of the processor 12 may be integrated in a single chip or a single die, and the processor 12 may be referred to as a System-on-Chip (SoC). In some example embodiments, the components of the processor 12 may be integrated in at least two chips included in one package, and the processor 12 may be referred to as a System-in-Package (SiP). In some example embodiments, the processor 12 may also be referred to as an application processor, etc., but is not limited thereto.

The at least one core 12_1 may refer to an arbitrary processing element configured to execute instructions (e.g., computer readable instructions and/or machine executable instructions, etc.). In some example embodiments, the at least one core 12_1 may execute instructions included in a program image, which is a software image stored in the system memory 14. For example, at least some of the instructions included in the program image stored in the system memory 14 may be copied to a memory of the processor 12, for example, the RAM 12_2 or a cache included in the at least one core 12_1, and the at least one core 12_1 may execute the copied instructions, but the example embodiments are not limited thereto. In some example embodiments, the at least one core 12_1 may include a plurality of homogeneous cores and/or a plurality of heterogeneous cores, each of which may independently execute instructions. For example, each of the plurality of homogeneous cores and/or the plurality of heterogeneous cores may include a low-performance processor and/or a high-performance processor, or include a non-security processor and/or a security processor, etc.

The RAM 12_2 may store, e.g., temporarily store, data used by the at least one core 12_1 and/or another component of the processor 12. For example, the RAM 12_2 may temporarily store data read from the system memory 14 and/or the system storage 16, and/or temporarily store data to be written to the system memory 14 and/or the system storage 16. Also, the RAM 12_2 may temporarily store instructions executed by the at least one core 12_1. In some example embodiments, the RAM 12_2 may include a volatile memory (e.g., static RAM (SRAM), etc.) that operates at relatively high speed.

The ROM 12_3 may store the program image, which is executed by the at least one core 12_1, in a non-volatile manner. For example, as shown in FIG. 1, the ROM 12_3 may store a bootloader IMG0 including the instructions (e.g., computer readable instructions, etc.), which are firstly executed by the at least one core 12_1, when the supply of power to the processor 12 is initialized or the processor 12 is reset, but is not limited thereto. The ROM 12_3 may be referred to as boot ROM. In some example embodiments, the ROM 12_3 may further store immutable data (e.g., read-only data, etc.) to which the at least one core 12_1 refers during the execution of the instructions.

The secure memory 12_4 may store data (e.g., unique data, etc.) of the processor 12 in a non-volatile manner. In some example embodiments, the secure memory 12_4 may store data, including at least one hardware key or a digest thereof, etc., which is used to encrypt and/or decrypt data in the processor 12 and has a unique value of the processor 12 (e.g., a unique identifier corresponding to the processor 12, a unique value associated with the processor 12, etc.). For example, the digest may be used to verify a key. As used herein, the digest may refer to information obtained based on an algorithm, which is cryptographically verified by the source information to verify source information. Digests corresponding to different pieces of source information may also be different from each other. For example, a digest of a hardware key may refer to a hash derived from the hardware key based on a hash algorithm (e.g., a source hash algorithm (SHA), etc.), but the example embodiments are not limited thereto and other methods of generating the digest from the hardware key may be used. In some example embodiments, the secure memory 12_4 may store information used to authenticate the software image loaded in the system memory 14. For example, as described below with reference to FIG. 6A, the secure memory 12_4 may store a key used to verify a signature (e.g., digital signature, electronic signature, etc.) included in the software image and/or a digest (e.g., a hash) of the key. As used herein, a key or a digest thereof, which is stored in the processor 12 and used to verify the signature included in the software image, may be referred to as a hard key or a device key, and the processor 12 may be referred to as including the hard key. In some example embodiments, the secure memory 12_4 may include a one-time-programmable (OTP) memory, such as an anti-fuse array, but is not limited thereto. In some example embodiments, the hard key described above may be stored in the ROM 12_3. For example, as described below with reference to FIG. 6B, the hard key may be included in the bootloader IMG0 or independently stored in a region of the ROM 12_3, which is different from a region corresponding to the bootloader IMG0, but the example embodiments are not limited thereto.

The system memory 14 may store at least one software image, but is not limited thereto. In some example embodiments, non-limiting examples of the system memory 14 may include volatile memory devices, such as dynamic random access memory (DRAM) and/or static RAM (SRAM), etc. In some example embodiments, non-limiting examples of the system memory 14 may include non-volatile memory devices, such as flash memory, electrically erasable programmable read-only memory (EEPROM), silicon-oxide-nitride-oxide-silicon (SONOS) memory, a polymer memory, magnetic RAM (MRAM), phase-change RAM (PRAM), and/or resistive RAM (RRAM), etc.

The processor 12 may execute program code (e.g., computer readable instructions, machine readable instructions, etc.) included in at least one software image stored in the ROM 12_3 and/or load at least one software image stored in the system storage 16 into the system memory 14, etc., and execute loaded program code. For example, the bootloader IMG0 stored in the ROM 12_3 may be executed by the at least one core 12_1, and thus, a first software image IMG1 may be loaded into the system memory 14 from the system storage 16. Also, the first software image IMG1 (i.e., instructions included in the first software image IMG1) may be executed by the at least one core 12_1, and thus, a second software image IMG2 may be loaded into the system memory 14 from the system storage 16. Similarly, a third software image IMG3 may be loaded into the system memory 14, etc., but the example embodiments are not limited thereto, and a greater or lesser number of software images may be loaded into the system memory 14. In some example embodiments, at least one software image (e.g., the first software image IMG1 and the second software image IMG2, etc.), which is loaded into the system memory 14 subsequent to the bootloader IMG0, may also be referred to as a bootloader. As used herein, when the at least one core 12_1 is referred to as performing an operation by executing the instructions included in the software image, the processor 12 may be interpreted as performing the corresponding operation by executing the software image, or the processor 12 may be simply interpreted as performing the corresponding operation of the software image and/or included in the software image.

Attackers may attempt to hack the system 10 by changing the software image loaded in the system memory 14 and/or loading the changed software image into the system memory 14, etc. Thus, before the software image loaded in the system memory 14 is used, the system 10 may authenticate (e.g., verify, etc.) the loaded software image and use the authenticated software image. The authentication of the software image may include determining the authenticity of the software image and may refer to determining that the software image has been generated by an authenticated entity. Thus, the software image authenticated on the system 10 may refer to a reliable software image, and/or a verified software image generated and/or obtained from an authenticated entity, etc. For example, the bootloader IMG0 may authenticate the first software image IMG1 after the first software image IMG1 is loaded into the system memory 14. The processor 12 may execute the authenticated first software image IMG1. Similarly, the authenticated first software image IMG1 may authenticate the second software image IMG2, and the authenticated second software image IMG2 may authenticate the third software image IMG3, etc., but the example embodiments are not limited thereto. In some example embodiments, the bootloader IMG0 may authenticate the second software image IMG2 or the third software image IMG3, and the authenticated first software image IMG1 may authenticate the third software image IMG3, etc., or in other words, each of the software images may be authenticated by the bootloader IMG0 and/or a previously authenticated software image. Thus, a procedure of loading, authenticating, and executing the software image may be referred to as a secure boot. In some example embodiments, the software image, which is unsuccessfully authenticated, may not be executed by the system 10 (e.g., the software image which was not properly authenticated and/or verified is prohibited from being executed by the system 10 and/or the processor 12, etc.).

As described above, the hard key may be used as information for authenticating the software image. Various software images may be used in the system 10 (i.e., may be executed by the processor 12) and generated by a plurality of subjects. For example, a manufacturer of the processor 12, a manufacturer of the system 10, a provider of the system 10, an administrator of the system 10, a software provider, and/or the like, may generate software images which are stored in the system memory 14. The authentication of the various software images, which are generated by the plurality of subjects as described above, by using the hard key included in the processor 12 may not only limit and/or decrease the generation of unauthorized and/or modified software images by various subjects, but also limit and/or decrease the exposure of the hard key, or a private key from which the hard key is derived. In addition, the processor 12 may include a limited number of hard keys, and therefore, it may not be easy and/or more difficult to modify the hard key stored in the secure memory 12_4 and/or the ROM 12_3 later. Furthermore, the continuous authentication of software images updated and/or newly installed in the system 10 using limited hard keys during the maintenance of the system 10 may not only involve continuously managing the private key from which the hard key is derived, but may also cause the unwanted and/or undesired exposure of the hard key, thereby increasing the risk of exposing the hard key to malicious parties.

As described below with reference to the drawings, an improved system security method capable of protecting the system from advanced attacks according to at least one example embodiment may include having a software image loaded in the system memory 14 which includes not only the program image including the instructions (e.g., computer readable instructions, etc.) executed by the processor 12, but also a keychain image including at least one key (and/or a digest thereof) used to authenticate the software image. In some example embodiments, the keychain image may also be referred to as a key storage image. According to at least one example embodiment, the system 10 may authenticate not only the program image, but also the keychain image, and thus, keys for authenticating the software image may be safely extended using the authenticated keychain image. As a result, problems caused by limiting the authentication of the software image to the hard key may be solved, and the risk of exposing the hard key(s) may be decreased and/or reduced. As used herein, a key or a digest thereof, which is included in the keychain image and used to authenticate the software image, may be referred to as a soft key, and the keychain image may be referred to as including at least one soft key, but is not limited thereto. The program image and the keychain image will be described below with reference to FIG. 2.

According to some example embodiments, the system storage 16 may not lose data stored therein even if power supply to the system 10 is interrupted. For example, the system storage 16 may include a non-volatile memory device and/or a storage medium, such as tape, a magnetic disc, and/or an optical disc, etc. The processor 12 may process data stored in the system storage 16 or generate data and store the data in the system storage 16. Additionally, the processor 12 may load the software image stored in the system storage 16 into the system memory 14.

Figure 2:
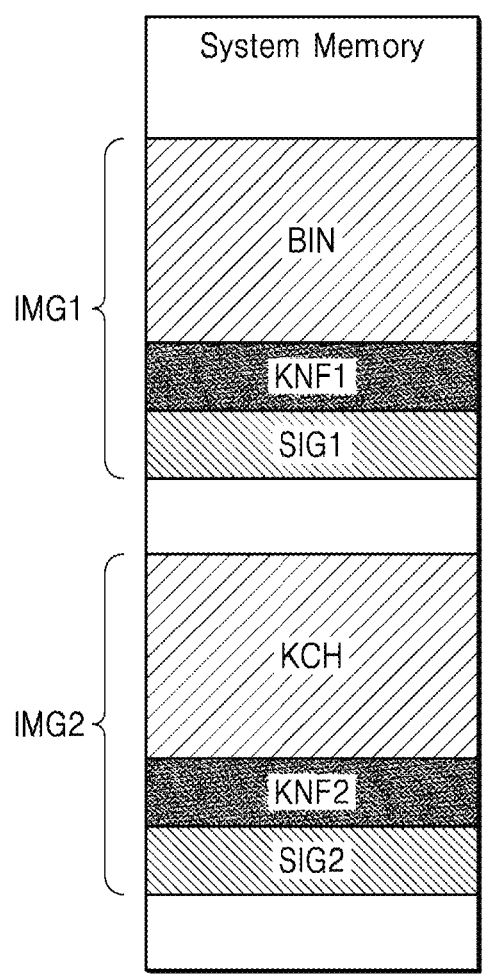
FIG. 2 is a diagram of an example of a system memory configured to store a software image according to at least one example embodiment.

FIG. 2 is a diagram of an example of a system memory 20 configured to store a software image according to at least one example embodiment. As shown in FIG. 2, the system memory 20 may store, for example, a first software image IMG1 and a second software image IMG2, but is not limited thereto. Software images stored in the system memory 20 may be dynamically changed, and FIG. 2 shows a state of the system memory 20 at a specific point in time. For example, the system memory 20 may simultaneously store at least two software images, and at least one of the first software image IMG1 and the second software image IMG2 may be replaced or invalidated due to the loading of a new software image, but the example embodiments are not limited thereto and the number of software images stored in the system memory 20 may be greater or lesser than two. Hereinafter, FIG. 2 will be described with reference to FIG. 1.

The system memory 20 may store at least one program image and at least one keychain image, etc., as one or more software images, but is not limited thereto. For example, as shown in FIG. 2, the first software image IMG1, which is the program image, may include a binary image BIN, first key information KNF1, and/or a first digital signature SIG1, etc., but the example embodiments are not limited thereto. Also, the second software image IMG2, which is the keychain image, may include a keychain KCH, second key information KNF2, and/or a second digital signature SIG2, etc. In some example embodiments, as shown in FIG. 2, the program image and the keychain image may have the same structure and may be generated by a common system as described below with reference to FIG. 11, but the example embodiments are not limited thereto, and according to other example embodiments, the program image and the keychain image may be generated using different systems and/or may have different structures.

The binary image BIN included in the first software image IMG1 may include a series of instructions executed by at least one core 12_1. For example, the binary image BIN may be generated by compiling and/or interpreting source code that is written in a programming language. In some example embodiments, the binary image BIN may include not only the instructions but also data, which is referred to, associated with, and/or used by the instructions. The binary image BIN may be referred to as binary data, binary code, a binary code image, or the like.

The keychain KCH included in the second software image IMG2 may include at least one soft key, but is not limited thereto. For example, the keychain KCH may include a plurality of soft keys or digests thereof, which are used to authenticate software images, and which are different from the second software image IMG2. Examples of the keychain KCH will be described below with reference to FIG. 3.

Both the program image and the keychain image may include key information. The key information may be information about a key used to authenticate a software image (e.g., a corresponding software image, an associated software image, etc.). For example, the first key information KNF1 may indicate information about a key used for the authentication of the first software image IMG1, and the second key information KNF2 may indicate information about a key used for the authentication of the second software image IMG2, etc. The key information may include a value indicating a hard key or a soft key (e.g., a value indicating whether a hard key type or a soft key type is to be used to authenticate the corresponding software image, etc.), and may further include a key index for identifying one of a plurality of hard keys and/or a plurality of soft keys (e.g., the key index will identify the desired and/or specific hard key or soft key to be used to perform the authentication/verification of the corresponding software image, etc.).

Both the program image and the keychain image may each include a digital signature, but the example embodiments are not limited thereto, and a single digital signature may be used for both the program image and the associated keychain image. The digital signature, which is used to authenticate the software image (i.e., verify the authenticity of the software image), may be verified by the key, and a successfully verified software image may be referred to as an authenticated software image. For example, the first digital signature SIG1 included in the first software image IMG1 may be verified by the hard key stored in the processor 12, or the soft key included in the keychain image based on the first key information KNF1. Also, the second digital signature SIG2 included in the second software image IMG2 may be verified by the hard key stored in the processor 12 or the soft key included in the keychain image based on the second key information KNF2. Software image including a signature, such as the first software image IMG1 and the second software image IMG2, may be referred to as a signed software image. As used herein, the signed software image may be simply referred to as a software image. Examples of a method of generating a software image will be described below with reference to FIGS. 11 to 14, but are not limited thereto.

Figure 3:
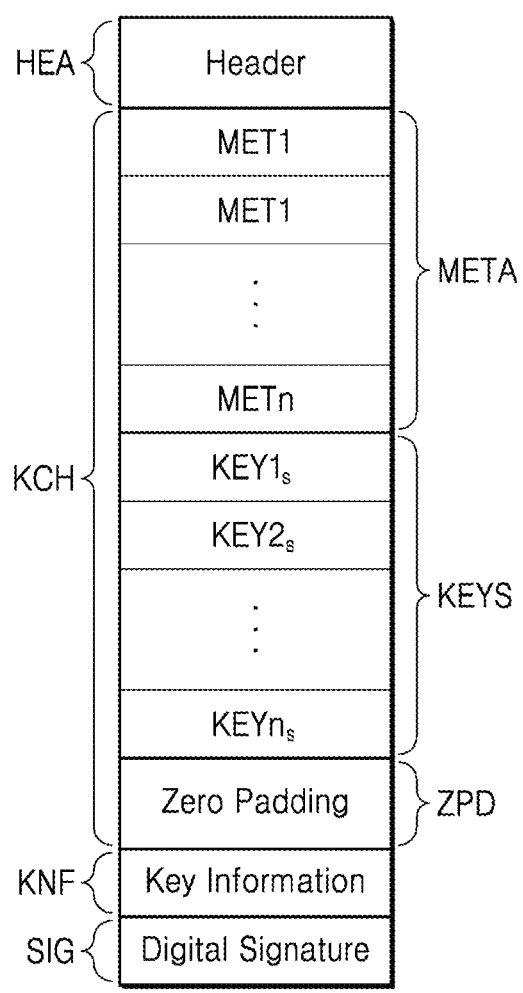
FIG. 3 is a diagram of an example of a structure of a keychain image according to at least one example embodiment.

FIG. 3 is a diagram of an example of a structure of a keychain image 30 according to at least one example embodiment. The keychain image 30 may include a keychain KCH, key information KNF, and/or a digital signature SIG as described above with reference to FIG. 2 and may further include a header HEA, but the example embodiments are not limited thereto. In some example embodiments, a keychain image may have a structure in which components are arranged in a different manner from that shown in FIG. 3, include only some of components shown in FIG. 3, or further include additional components that are not shown in FIG. 3. Hereinafter, the same description as in the structure shown in FIG. 2 will be omitted.

The header HEA may include information about the keychain image 30. For example, non-limiting examples of the header HEA may include at least one of an identifier indicating the keychain image 30, a version of the keychain image 30, a length of the header HEA, the number of soft keys included in the keychain KCH, generation information (e.g., a generation date and/or a generator) of the keychain image 30, and/or lengths of valid data (e.g., a meta region META and a key region KEYS) included in the keychain KCH, but the example embodiments are not limited thereto. A processor 12 and/or a software developer may identify the keychain image 30 and/or an associated software image based on information included in the header HEA.

The keychain KCH may include a meta region META, a key region KEYS, and/or a zero padding region ZPD, etc., but is not limited thereto. The meta region META may include metadata about the soft keys included in the key region KEYS (e.g., the metadata may correspond to and/or may be associated with the soft keys included in the key region KEYS, etc.). For instance, as shown in FIG. 3, the meta region META may include first to n-th metadata pieces MET1 to METn corresponding to first to n-th soft keys $KEY1_S$ to $KEYn_S$ included in the key region KEYS (here, n is an integer greater than 0). The metadata may include information about a soft key corresponding thereto. For example, non-limiting examples of the metadata may include at least one of a name of a soft key, group information to which the soft key belongs, information about a software image to be authenticated by the soft key (e.g., software image information, etc.), and/or an identifier of the soft key (e.g., a unique identifier for the soft key), etc. The key region KEYS may include at least one soft key. For example, as shown in FIG. 3, the key region KEYS may include the first to n-th soft keys $KEY1_S$ to $KEYn_S$. As described above, the soft key included in the key region KEYS may be used to verify a digital signature included in the software image. In some example embodiments, the soft key included in the key region KEYS may be a public key generated together with and/or based on a private key, or a digest (e.g., a hash, etc.) of the public key. The zero padding region ZPD may have a variable length according to the number of soft keys included in the keychain KCH and/or the length of the soft keys included in the keychain KCH. The zero padding region ZPD may include arbitrary data (e.g., all-zero data, all-one data, randomly generated data, etc.).

As described above with reference to FIG. 2, the key information KNF may include information about a key (e.g., a signature key, etc.) used to authenticate the keychain image 30 (i.e., a signature key used to verify the digital signature SIG). Also, as described above with reference to FIG. 2, the digital signature SIG may be verified by a key (e.g., a signature key) specified by the key information KNF, and the keychain image 30 may be authenticated when the verification of the digital signature SIG is successful.

Figure 4:
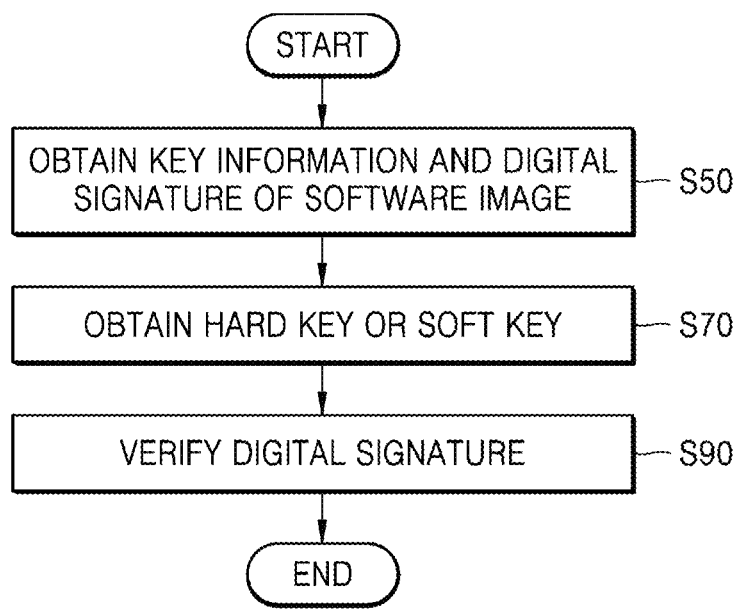
FIG. 4 is a flowchart of an example of a method of authenticating software, according to at least one example embodiment.

FIG. 4 is a flowchart of an example of a method of authenticating software, according to at least one example embodiment. Specifically, the flowchart of FIG. 4 illustrates a method of authenticating a software image. In some example embodiments, the method of FIG. 4 may be performed by the system 10 of FIG. 1, but the example embodiments are not limited thereto and other hardware may be used to perform the operations of the example methods. For example, the authentication of the software image may be performed by the bootloader IMG0 or a previously authenticated software image (i.e., a program image). The method of authenticating the software image may include a plurality of operations S50, S70, and S90 as shown in FIG. 4 and may be assumed to be performed by the processor 12 of FIG. 1, but is not limited thereto. The method shown in FIG. 4 will be described with reference to FIG. 1.

In some example embodiments, the method of authenticating the software image, which is shown in FIG. 4, may be performed by a security processor (e.g., dedicated security processing circuitry, etc.), etc. For example, as in an integrated circuit (IC) including a security processor and a non-security processor, which has been disclosed in Korean Patent Application No. 10-2020-0002692 entitled "APPARATUS AND METHOD FOR SECURELY MANAGING KEYS," filed on the same date as the present application by the present applicant, in the Korean Intellectual Property Office, the disclosure of which is incorporated herein in its entirety by reference, the processor 12 of FIG. 1 may include a security processor and a non-security processor, and the method of authenticating the software image, which is shown in FIG. 4, may be performed by the security processor included in the processor 12.

In operation S50, an operation of obtaining key information and/or a digital signature of the software image may be performed. For example, the processor 12 may read the key information and/or the digital signature, which are included in the software image, from the system memory 14. In some example embodiments, unlike that shown in FIG. 4, operation S70 may be followed by an operation of obtaining the digital signature, or in other words, the key information may be obtained at a separate time and/or during a separate read operation from the digital signature.

In operation S70, an operation of obtaining a hard key or a soft key may be performed. For example, the processor 12 may determine whether a key used to authenticate the software image is the hard key or the soft key, based on the key information obtained in operation S50, and may obtain the hard key or the soft key based on the determination result. An example of operation S70 will be described below with reference to FIG. 5.

In operation S90, an operation of verifying the digital signature may be performed. For example, the processor 12 may verify the digital signature, which may be obtained, for example, in operation S50, by using the key obtained in operation S70. In some example embodiments, the key (i.e., the hard key or the soft key) obtained in operation S70 may correspond to a public key (or a digest of the public key) in a key pair including a private key and the public key, and the digital signature may be derived from and/or generated using the private key, but the example embodiments are not limited thereto. Thus, when the software image is generated by an authenticated entity, the digital signature may be successfully verified based on the hard key or the soft key.

Figure 5:
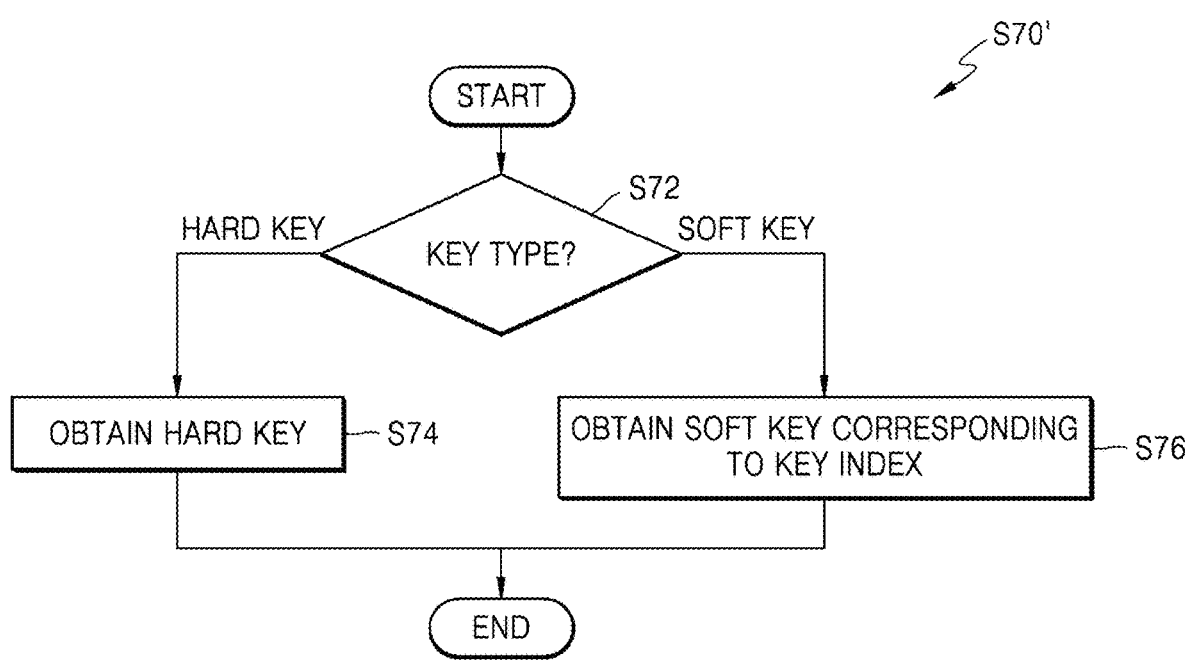
FIG. 5 is a flowchart of an example of a method of authenticating software, according to at least one example embodiment.

FIG. 5 is a flowchart of an example of a method of authenticating software, according to at least one example embodiment. Specifically, the flowchart of FIG. 5 illustrates an example of operation S70 of FIG. 4. As described above with reference to FIG. 4, an operation of obtaining a hard key or a soft key may be performed in operation S70' of FIG. 5. As shown in FIG. 5, operation S70' may include a plurality of operations S72, S74, and S76. Hereinafter, the flowchart of FIG. 5 will be described with reference to FIG. 1.

In operation S72, an operation of determining a key type may be performed. For example, the processor 12 may determine whether to obtain the hard key or the soft key based on a value indicating the key type, which is included in key information. As shown in FIG. 5, when the key information includes the value indicating the hard key (e.g., the value indicates using the hard key type), an operation of obtaining the hard key may be performed in operation S74, but the example embodiments are not limited thereto. In some example embodiments, the key information may include a key type field, which may include a value indicating the hard key or the soft key. In some example embodiments, the processor 12 may include a plurality of hard keys. The key information may include a key index for identifying a desired hard key from among the plurality of hard keys, and the processor 12 may obtain the desired hard key from among the plurality of hard keys, based on the key index. Examples of the operation of obtaining the hard key in operation S74 will be described below with reference to FIGS. 6A and 6B.

As another example, when the key information includes a value indicating the soft key (e.g., the value indicates the use of a soft key type), an operation of obtaining a soft key corresponding to the key index may be performed in operation S76. For example, the processor 12 may extract the key index included in the key information and obtain a desired soft key corresponding to the key index, from among a plurality of soft keys included in a keychain image. The key index may include arbitrary information capable of identifying the desired soft key in the keychain image. For example, the key index may include an address offset of a region of the keychain image (or, e.g., the keychain KCH of FIG. 3), in which the soft key is stored. Also, the key index may include an identifier capable of identifying the soft key, for example, a cyclic redundancy check (CRC), checksum, or non-cryptic hash of the soft key, and/or a search key generated by an arbitrary algorithm for generating a search key, etc., but the example embodiments are not limited thereto. An example of operation S76 will be described below with reference to FIG. 7.

Figure 6A:
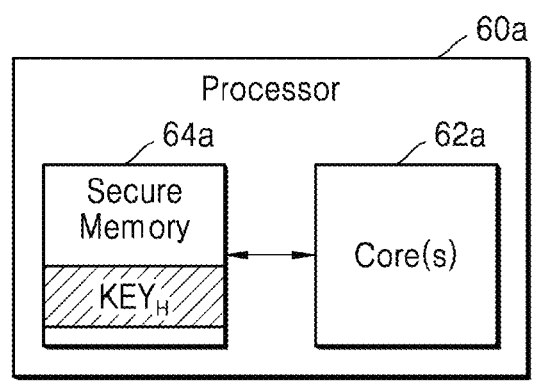
FIGS. 6A and 6B are block diagrams of examples of an operation of obtaining a hard key according to some example embodiments.
Figure 6B:
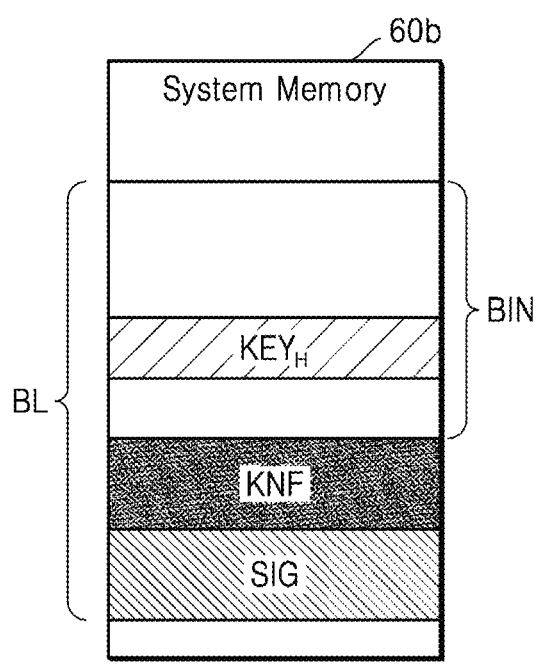

FIGS. 6A and 6B are block diagrams of examples of an operation of obtaining a hard key according to some example embodiments. As described above with reference to FIG. 5, when key information (e.g., key type information) included in a software image includes a value indicating a hard key (e.g., a value indicating the use of a hard key type), the processor 12 of FIG. 1 may obtain a hard key $KEY_H$ based on the key type information. Descriptions of aspects of FIGS. 6A and 6B, which are the same as given above with reference to previously discussed drawings, will be omitted.

Referring to FIG. 6A, the hard key $KEY_H$ may be stored in a secure memory 64a, but the example embodiments are not limited thereto. For example, as shown in FIG. 6A, a processor 60a (e.g., processing circuitry, etc.) may include at least one core 62a and the secure memory 64a, and the secure memory 64a may store the hard key $KEY_H$. The at least one core 62a (i.e., a program image that is loaded into and executed by the at least one core 62a and allows the at least one core 62a to perform the software authentication of at least one example embodiment) may access the secure memory 64a and obtain the hard key $KEY_H$. In some example embodiments, the hard key $KEY_H$ may be programmed to a non-rewritable non-volatile memory, which is included in the secure memory 64a, during a process of manufacturing the processor 60a, but the example embodiments are not limited thereto. In some example embodiments, the secure memory 64a may store a plurality of hard keys including the hard key $KEY_H$, but the example embodiments are not limited thereto.

Referring to FIG. 6B, according to other example embodiments, the hard key $KEY_H$ may be included in a program image. For example, as shown in FIG. 6B, a bootloader BL may include a binary image BIN, key information KNF, and a digital signature SIG and be loaded as the program image into a system memory 60b. The hard key $KEY_H$ may be included in the binary image BIN of the bootloader BL. Thus, a processor and/or processing circuitry, such as the processor 12 of FIG. 1, or a program image that is loaded into and executed by the processor, thereby transforming the processor into a processor for performing the software authentication of at least one example embodiment, may access the bootloader BL stored in the system memory 60b and obtain the hard key $KEY_H$.

Figure 7:
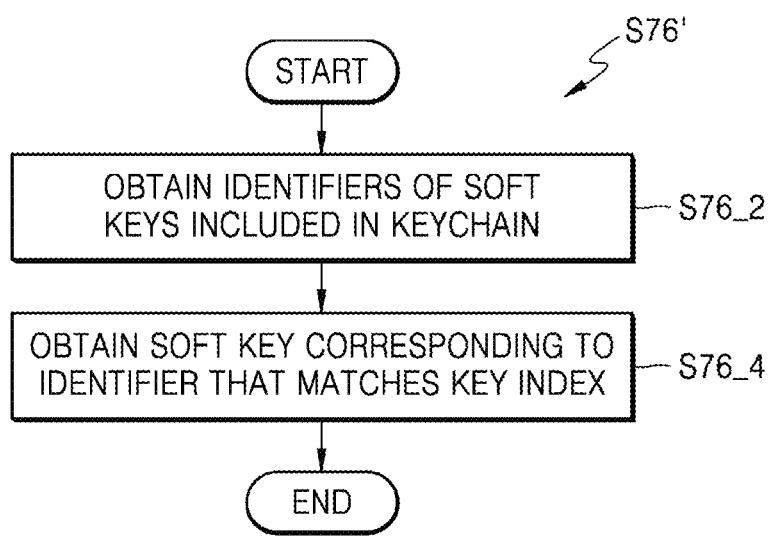
FIG. 7 is a flowchart of an example of a method of authenticating software, according to at least one example embodiment.

FIG. 7 is a flowchart of an example of a method of authenticating software, according to at least one example embodiment. Specifically, the flowchart of FIG. 7 illustrates an example of operation S76 of FIG. 5. As described above with reference to FIG. 5, an operation of obtaining a soft key corresponding to a key index may be performed in operation S76' of FIG. 7. As shown in FIG. 7, operation S76' may include operation S76_2 and operation S76_4. Hereinafter, FIG. 7 will be described on the assumption that one of the first to n-th soft keys $KEY1_S$ to $KEYn_S$ included in the keychain image 30 of FIG. 3 is obtained, but the example embodiments are not limited thereto. The flowchart of FIG. 7 will be described with reference to FIGS. 1 and 3, but the example embodiments are not limited thereto.

In operation S76_2, an operation of obtaining identifiers of soft keys included in a keychain may be performed. For example, the processor 12 may obtain identifiers of first to n-th soft keys $KEY1_S$ to $KEYn_S$ included in a keychain KCH of the keychain image 30. In some example embodiments, first to n-th metadata pieces MET1 to METn may respectively include the identifiers of the first to n-th soft keys $KEY1_S$ to $KEYn_S$, and the processor 12 may obtain the identifiers from the first to n-th metadata pieces MET1 to METn. In some example embodiments, the processor 12 may generate identifiers from the first to n-th soft keys $KEY1_S$ to $KEYn_S$, but the example embodiments are not limited thereto. In some example embodiments, as described with reference to FIG. 10, the processor 12 may obtain identifiers of soft keys included in a plurality of keychain images.

In operation S76_4, an operation of obtaining a soft key corresponding to an identifier (e.g., a desired key identifier, etc.) that matches the key index may be performed. For example, a key index included in key information may be an identifier of a soft key, and the processor 12 may determine an identifier, which matches the key index, from among the identifiers obtained in operation S76_2, and obtain the soft key corresponding to the determined identifier.

Figure 8:
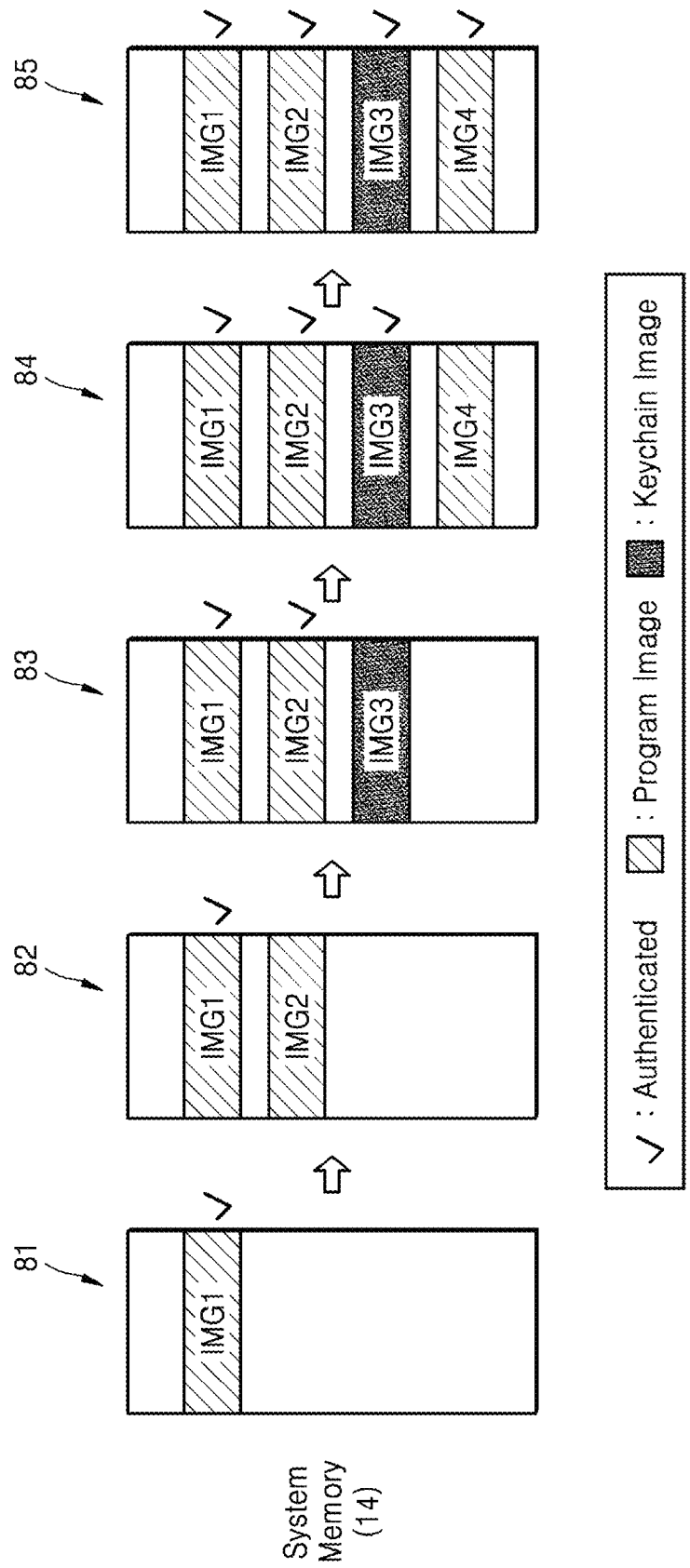
FIG. 8 is a diagram of an example of an operation of authenticating software images according to at least one example embodiment.

FIG. 8 is a diagram of an example of an operation of authenticating software images according to at least one example embodiment. Specifically, FIG. 8 illustrates first to fifth states 81 to 85 of the system memory 14 of FIG. 1 during a process of authenticating software images, but the example embodiments are not limited thereto. Hereinafter, FIG. 8 will be described with reference to FIG. 1, but the example embodiments are not limited thereto.

In the first state 81, the system memory 14 may store a first software image IMG1 as an authenticated program image. For example, the first software image IMG1 may be authenticated by a program image loaded in the system memory 14 before the first software image IMG1 is loaded, and/or may be authenticated by the bootloader IMG0 stored in the ROM 12_3, but the example embodiments are not limited thereto.

In the second state 82, a second software image IMG2 may be loaded as a program image into the system memory 14. For example, the authenticated first software image IMG1 may load the second software image IMG2 from the system storage 16 into the system memory 14 and may attempt to authenticate the loaded second software image IMG2, but the example embodiments are not limited thereto, and for example, the second software image IMG2 may be authenticated by the bootloader IMG0, etc.

In the third state 83, the second software image IMG2 may be authenticated, and a third software image IMG3 may be loaded as a keychain image into the system memory 14. For example, the second software image IMG2 may be authenticated using a hard key based on key information associated with the second software image IMG2, but the example embodiments are not limited thereto. Also, the authenticated first software image IMG1 or the authenticated second software image IMG2 may load a third software image IMG3 from the system storage 16 into the system memory 14 and attempt to authenticate the loaded third software image IMG3, etc.

In the fourth state 84, the third software image IMG3 may be authenticated, and a fourth software image IMG4 may be loaded as a program image into the system memory 14. For example, the third software image IMG3 may be authenticated using a hard key or a soft key based on key information associated with the third software image IMG3, etc. Also, the authenticated first software image IMG1 or the authenticated second software image IMG2 may load the fourth software image IMG4 from the system storage 16 into the system memory 14 and may attempt to authenticate the loaded fourth software image IMG4, etc.

In the fifth state 85, the fourth software image IMG4 may be authenticated. For example, the fourth software image IMG4 may be authenticated using the hard key or a soft key included in the third software image IMG3, based on the key information associated with the fourth software image IMG4, etc. Thus, the system memory 14 may store sequentially authenticated software images, and the processor 12 may execute program images from among the stored software images. However, the example embodiments are not limited thereto, and the number of software images stored in the system memory 14 may be greater or less than four, etc.

Figure 9:
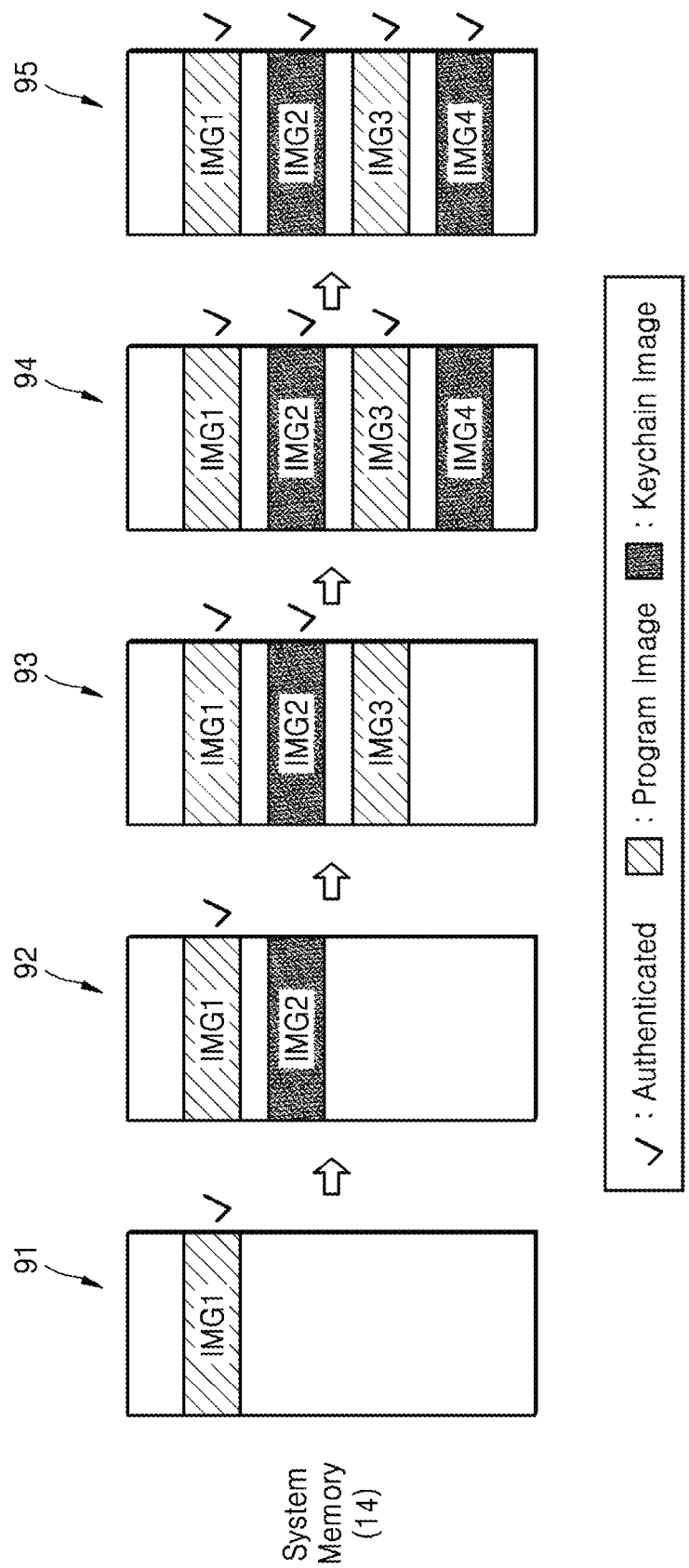
FIG. 9 is a diagram of an example of an operation of authenticating software images according to at least one example embodiment.

FIG. 9 is a diagram of an example of an operation of authenticating software images according to at least one example embodiment. Specifically, FIG. 9 illustrates first to fifth states 91 to 95 of the system memory 14 of FIG. 1 during the operation of authenticating the software images. Hereinafter, FIG. 9 will be described with reference to FIG. 1.

Referring to FIG. 9, in the first state 91, the system memory 14 may store a first software image IMG1 as an authenticated program image. For example, the first software image IMG1 may be authenticated on a program image loaded in the system memory 14 before the first software image IMG1 is loaded and/or may be authenticated on the bootloader IMG0 stored in the ROM 12_3, but the example embodiments are not limited thereto.

In the second state 92, a second software image IMG2 may be loaded as a keychain image into the system memory 14. For example, the authenticated first software image IMG1 may load the second software image IMG2 from a system storage 16 into the system memory 14 and may attempt to authenticate the loaded second software image IMG2, etc.

In the third state 93, the second software image IMG2 may be authenticated, and a third software image IMG3 may be loaded as a program image into the system memory 14. For example, the second software image IMG2 may be authenticated using a hard key based on key information associated with the second software image IMG2. Also, the authenticated first software image IMG1 may load the third software image IMG3 as the program image from the system storage 16 into the system memory 14 and may attempt to authenticate the loaded third software image IMG3.

In the fourth state 94, the third software image IMG3 may be authenticated, and a fourth software image IMG4 may be loaded as a keychain image into the system memory 14. For example, the third software image IMG3 may be authenticated using the hard key or a soft key based on key information associated with the third software image IMG3. When, for example, the key information of the third software image IMG3 indicates a desired soft key, the desired soft key associated with the third software image IMG3 included in the second software image IMG2 may be identified, and the third software image IMG3 may be authenticated using the desired soft key (e.g., identified soft key). Also, the authenticated first software image IMG1 or the authenticated third software image IMG3 may load the fourth software image IMG4 as the keychain image from the system storage 16 into the system memory 14 and may attempt to authenticate the loaded fourth software image IMG4.

In the fifth state 95, the fourth software image IMG4 may be authenticated. For example, the fourth software image IMG4 may be authenticated using a hard key or a soft key based on key information associated with the fourth software image IMG4. When, for example, the key information of the fourth software image IMG4 indicates a desired soft key, the desired soft key associated with the fourth software image IMG4 included in the second software image IMG2 may be identified, and the fourth software image IMG4 may be authenticated using the desired soft key (e.g., identified soft key).

Figure 10:
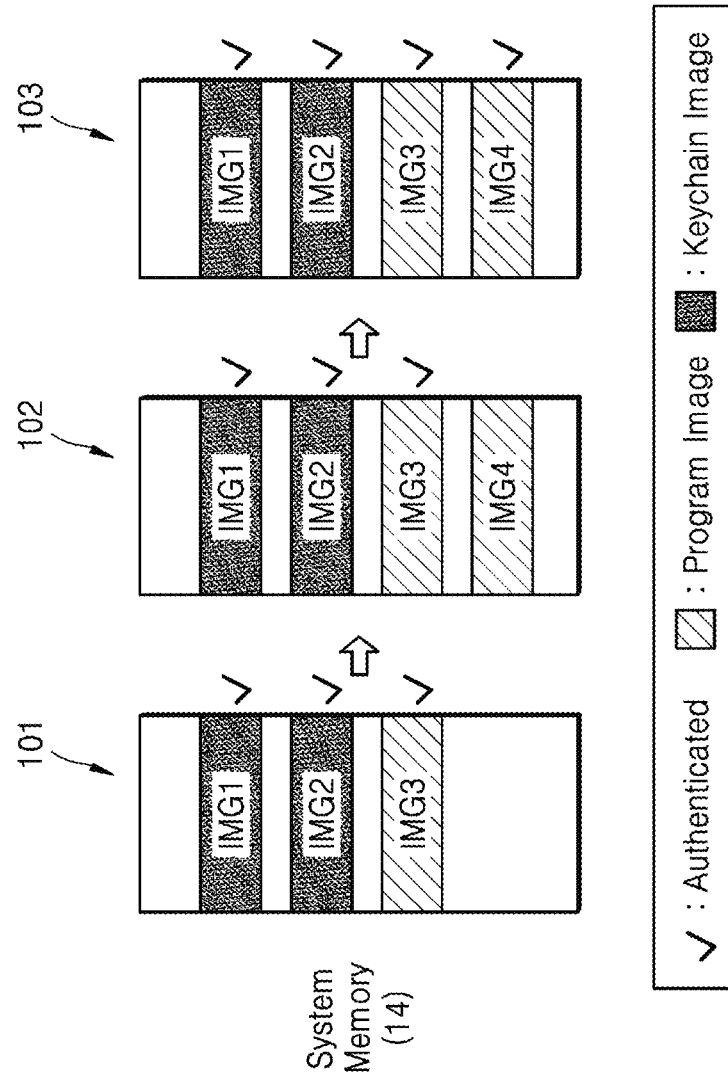
FIG. 10 is a diagram of an example of an operation of authenticating software images according to at least one example embodiment.

FIG. 10 is a diagram of an example of an operation of authenticating software images according to at least one example embodiment. Specifically, FIG. 10 illustrates first to third states 101 to 103 of the system memory 14 of FIG. 1 during the operation of authenticating the software images. Hereinafter, FIG. 10 will be described with reference to FIG. 1, but the example embodiments are not limited thereto.

Referring to FIG. 10, in the first state 101, the system memory 14 may store the first software image IMG1 as an authenticated keychain image, the second software image IMG2 as an authenticated keychain image, and the third program image IMG3 as an authenticated program image, but the example embodiments are not limited thereto.

In the second state 102, a fourth software image IMG4 may be loaded as a program image into the system memory 14. For example, the authenticated third software image IMG3 may load a fourth software image IMG4 from the system storage 16 into the system memory 14 and may attempt to authenticate the loaded fourth software image IMG4. The authentication of the fourth software image IMG4 may be attempted using, for example, a soft key based on key information associated with the fourth software image IMG4. That is, the key information of the fourth software image IMG4 may include a value indicating a desired soft key. In some example embodiments, the processor 12 may identify one of soft keys included in the first software image IMG1 and the second software image IMG2 as the desired soft key associated with the fourth software image IMG4, based on a key index included in the key information of the fourth software image IMG4, and may attempt to authenticate the fourth software image IMG4 using the desired soft key (e.g., the identified soft key). For example, the processor 12 may access the first software image IMG1 and the second software image IMG2 in sequential order (or in reverse order) and obtain identifiers of the soft keys of the first software image IMG1 and the second software image IMG2, and determine a software key corresponding to an identifier that matches the key index, but the example embodiments are not limited thereto.

In the third state 103, the fourth software image IMG4 may be authenticated. For example, the first software image IMG1 may include a soft key corresponding to the key index included in the key information of the fourth software image IMG4, and a digital signature included in the fourth software image IMG4 may be successfully verified using the corresponding soft key, but the example embodiments are not limited thereto.

Figure 11:
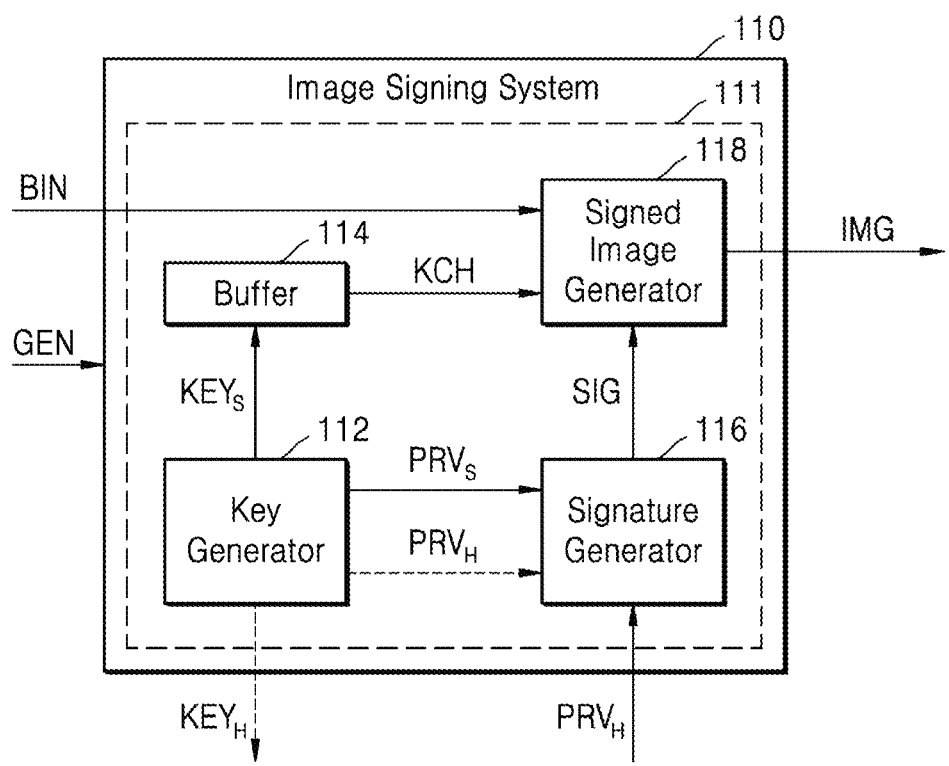
FIG. 11 is a block diagram of an example of an image signing system according to at least one example embodiment.

FIG. 11 is a block diagram of an example of an image signing system 110 according to at least one example embodiment. As shown in FIG. 11, the image signing system 110 may generate a software image IMG, which may be stored in the system storage 16 of FIG. 1, but the example embodiments are not limited thereto.

The image signing system 110 may be implemented as an arbitrary computing system, but the example embodiments are not limited thereto. For example, each of the components of the image signing system 110 may be implemented as a special purpose hardware module designed by logical synthesis, a special purpose software module executed by at least one processor core and/or processing circuitry, etc., a processing unit including at least one processor core and a special purpose software module, and/or any combinations thereof. The image signing system 110 may receive image generation information GEN. For example, the image generation information GEN may include a type (i.e., a program image or a keychain image) of the software image IMG (e.g., image type information), and a key type of a key used for the authentication of the associated and/or corresponding software image IMG (e.g., key type information). The image generation information GEN may be provided to the components included in the image signing system 110, but the example embodiments are not limited thereto. As shown in FIG. 11, the image signing system 110 may include processing circuitry 111, and the processing circuitry 111 may include at least one special purpose hardware or software module, such as a key generator 112, a buffer 114, a signature generator 116, and/or a signed image generator 118, etc., but the example embodiments are not limited thereto. For example, the processing circuitry 111 more specifically may include, but is not limited to, a central processing unit (CPU), an arithmetic logic unit (ALU), a digital signal processor (DSP), a graphics processing unit (GPU), a communication processor (CP), a microcomputer, a field programmable gate array (FPGA), a System-on-Chip (SoC), a programmable logic unit, a microprocessor, application-specific integrated circuit (ASIC), etc., and according to some example embodiments, may further include one or more of: interfaces, buses, memory, and/or controllers, etc.

According to at least one example embodiment, the key generator 112 may generate a key pair including a private key and a public key. For example, the key generator 112 may include a random number generator and may generate the key pair based on a random number (e.g., a seed number). As shown in FIG. 11, the key generator 112 may provide a soft key $KEY_S$ corresponding to the public key of the key pair to the buffer 114, and may provide a soft private key $PRV_S$ corresponding to the private key of the key pair to the signature generator 116. In some example embodiments, as indicated by a dashed arrow in FIG. 11, the key generator 112 may generate not only the soft key $KEY_S$, but also a hard key $KEY_H$ corresponding to the public key of the key pair, and may provide a hard private key $PRV_H$ corresponding to the hard key $KEY_H$ to the signature generator 116. In some example embodiments, the key generator 112 may be omitted, and the image signing system 110 may receive the key pair from the outside (e.g., an external source, a user, etc.).

The buffer 114 may receive the soft key $KEY_S$ from the key generator 112. The buffer 114 may include a memory, but is not limited thereto. The buffer 114 may collect the soft key $KEY_S$, may generate a keychain KCH, and may provide the keychain KCH to the signed image generator 118. In some example embodiments, the buffer 114 may generate a header HEA based on the image generation information GEN, and may provide the header HEA together with the keychain KCH to the signed image generator 118. In some example embodiments, the buffer 114 may be omitted together with the key generator 112, and the image signing system 110 may receive the keychain KCH from the outside (e.g., external source, etc.).

The signature generator 116 may receive the soft private key $PRV_S$ from the key generator 112 and may generate a digital signature SIG, which is derived from the soft private key $PRV_S$ according to at least one example embodiment, but is not limited thereto. Thus, the digital signature SIG may be verified by the soft key $KEY_S$ included in the key pair together with the soft private key $PRV_S$ from which the digital signature SIG is derived. The digital signature SIG may be generated based on an arbitrary signing algorithm, but is not limited thereto. For example, the digital signature SIG may be generated from the soft private key $PRV_S$ based on an elliptic curve digital signature algorithm (ECDSA), etc. Also, as shown in FIG. 11, the signature generator 116 may receive the hard private key $PRV_H$ from an external source and may generate not only a digital signature SIG verified by the soft key $KEY_S$ but also a digital signature SIG verified by the hard key $KEY_H$, etc.

According to at least one example embodiment, the signed image generator 118 may receive a binary image BIN, a keychain KCH, and a digital signature SIG, etc., and may generate a software image IMG. For instance, the signed image generator 118 may generate key information based on the image generation information GEN and may generate a software image IMG including the binary image BIN, the digital signature SIG, and the key information as the program image, etc. In addition, the signed image generator 118 may generate key information based on the image generation information GEN and may generate a software image IMG including the keychain KCH, the digital signature SIG, and the key information as the keychain image, etc. The signed image generator 118 may generate the program image and the keychain image in the same manner except that data included in the software image IMG is the binary image BIN or the keychain KCH, but the example embodiments are not limited thereto.

Figure 12:
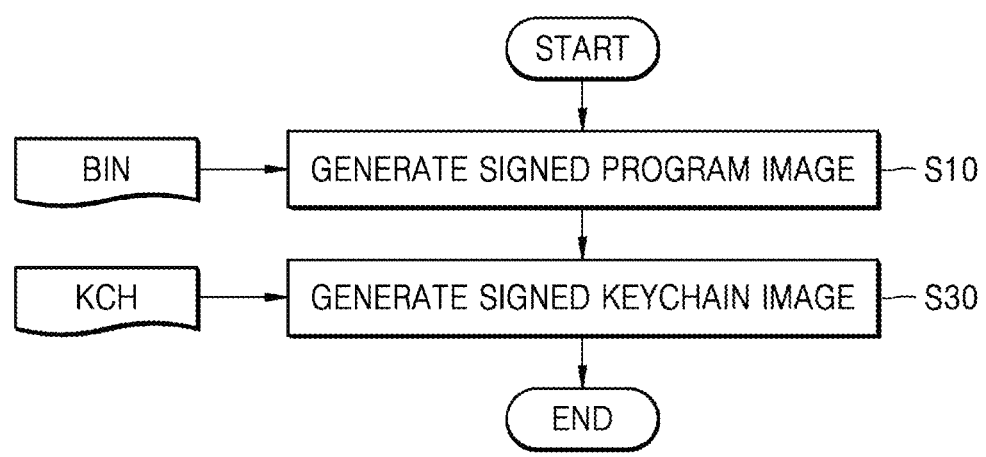
FIG. 12 is a flowchart of an example of a method of authenticating software, according to at least one example embodiment.

FIG. 12 is a flowchart of an example of a method of authenticating software, according to at least one example embodiment. Specifically, the flowchart of FIG. 12 illustrates an example of a method of generating a signed software image according to at least one example embodiment. In some example embodiments, the method of FIG. 12 may be performed by the image signing system 110 of FIG. 11. As shown in FIG. 12, the method of generating a signed software image may include operations S10 and S30. In some example embodiments, operations S10 and S30 may be performed in a different order from that shown in FIG. 12 and/or the operations S10 and S30 may be performed in parallel. Hereinafter, FIG. 12 will be described with reference to FIG. 11.

In some example embodiments, the method of FIG. 12 may be performed by at least one processor (e.g., processing circuitry, etc.) configured to execute program code including computer readable instructions corresponding to each operation. The instructions may be stored in a memory. The term "processor" may refer to a hardware-implemented data processing device including physically structured circuits to perform desired and/or predetermined operations including operations represented by instructions and code included in a program. In some example embodiments, non-limiting examples of the hardware-implemented data processing device may include a microprocessor (MP), a central processing unit (CPU), a processor core, a multi-core processor, a multi-processor, an application-specific integrated circuit (ASIC), and/or a field programmable gate array (FPGA), etc.

In operation S10, an operation of generating a signed program image may be performed. For example, the image signing system 110 may generate a signed program image including a binary image BIN, etc. An example of operation S10 will be described below with reference to FIG. 13, but the example embodiments are not limited thereto.

In operation S30, an operation of generating a signed keychain image may be performed. For example, the image signing system 110 may generate a signed program image including a keychain KCH including at least one soft key, etc. An example of operation S30 will be described below with reference to FIG. 14, but the example embodiments are not limited thereto.

Figure 13:
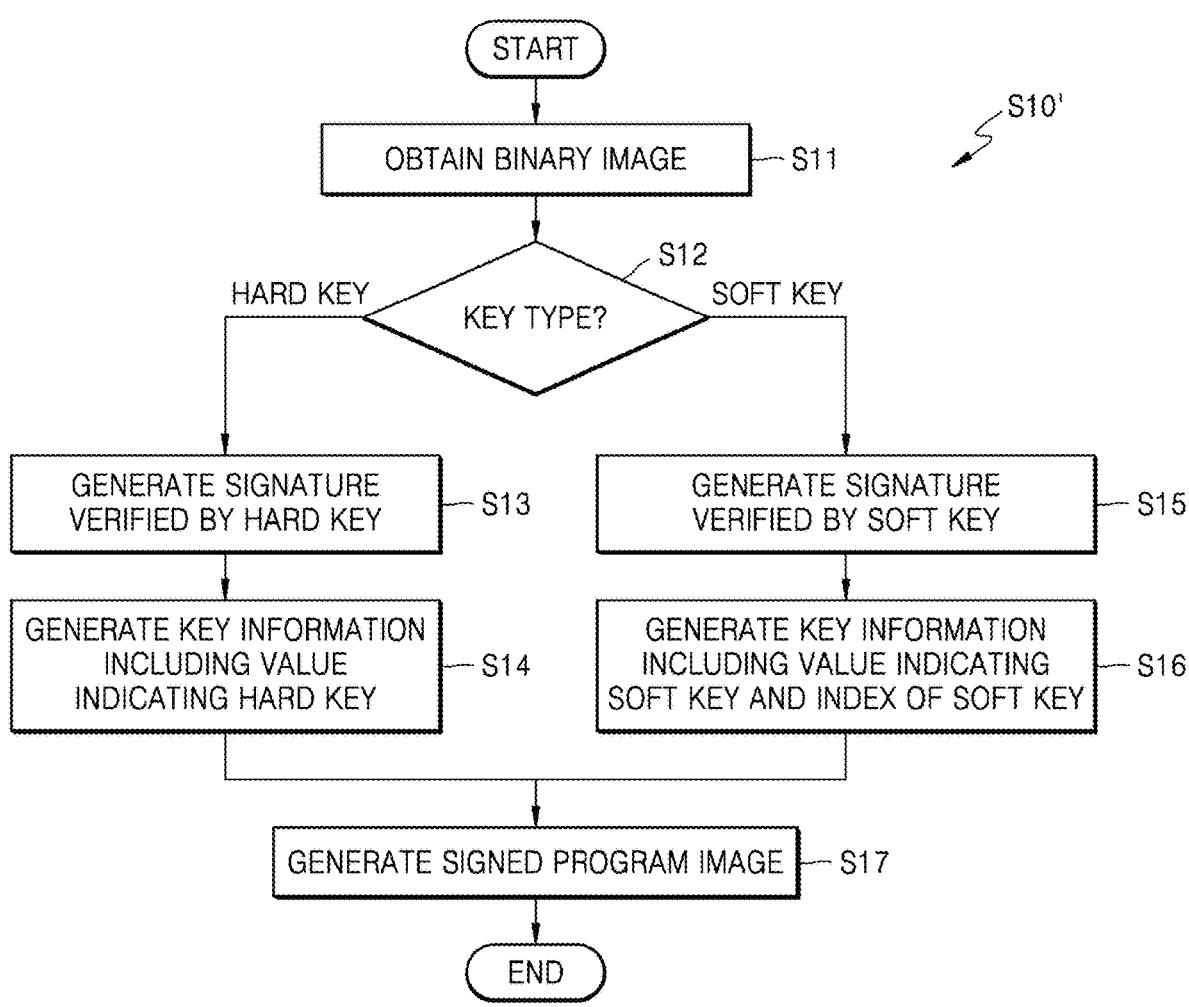
FIG. 13 is a flowchart of an example of a method of authenticating software, according to at least one example embodiment.

FIG. 13 is a flowchart of an example of a method of authenticating software, according to at least one example embodiment. Specifically, the flowchart of FIG. 13 illustrates an example of operation S10 of FIG. 12, but the example embodiments are not limited thereto. As described above with reference to FIG. 12, an operation of generating a signed program image may be performed in operation S10' of FIG. 13, but the example embodiments are not limited thereto. As shown in FIG. 13, operation S10' may include a plurality of operations S11 to S17, but the example embodiments are not limited thereto. Hereinafter, FIG. 13 will be described with reference to FIG. 11, but the example embodiments are not limited thereto.

In operation S11, an operation of obtaining a binary image BIN may be performed. For example, the image signing system 110 may receive a binary image BIN including a series of instructions from the outside (e.g., an external source), etc.

In operation S12, an operation of determining a key type associated with the obtained binary image BIN may be performed. For example, the image signing system 110 may determine the key type associated with the obtained binary image BIN based on image generation information GEN. As shown in FIG. 13, when the key type associated with the obtained binary image BIN is a hard key, operation S13 may be subsequently performed. Otherwise, if the key type associated with the obtained binary image BIN is a soft key, operation S15 may be sequentially performed.

When the key type is the hard key, an operation of generating a signature verified by the hard key may be performed in operation S13. For instance, the signature generator 116 may receive a hard private key $PRV_H$ corresponding to a hard key $KEY_H$, based on the image generation information GEN, and may generate a digital signature SIG verified by the hard key $KEY_H$, but the example embodiments are not limited thereto. Next, in operation S14, an operation of generating key information including a value indicating the hard key may be performed. For example, the signed image generator 118 may generate key information including the value indicating and/or identifying the desired hard key to use to verify the software image, based on the image generation information GEN. In some example embodiments, when at least two hard keys are used to authenticate a software image, key information may include not only the value indicating the key type to be used to verify the software image (e.g., a value indicating the use of a hard key, etc.), but also include a key index for identifying the desired hard key associated with the software image.

When the key type information indicates the desired key associated with the software image is the soft key, an operation of generating a signature verified by the soft key may be performed in operation S15. For example, the signature generator 116 may receive a soft private key $PRV_S$ corresponding to a soft key $KEY_S$ from the key generator 112 or the outside of (e.g., an external source, etc.) the image signing system 110, based on the image generation information GEN, and may generate a digital signature SIG verified by the soft key $KEY_S$. Next, in operation S16, an operation of generating key information including a value indicating the soft key type and an index of the desired soft key associated with the software image may be performed. For example, based on the image generation information GEN, the signed image generator 118 may generate key information including the value indicating the soft key type and an index (e.g., key index, etc.) capable of identifying the desired soft key associated with the software image in a keychain image including the soft key.

In operation S17, an operation of generating the signed program image may be performed. For example, the signed image generator 118 may generate the signed program image including the binary image BIN, the key information, and the digital signature SIG, etc., but is not limited thereto.

Figure 14:
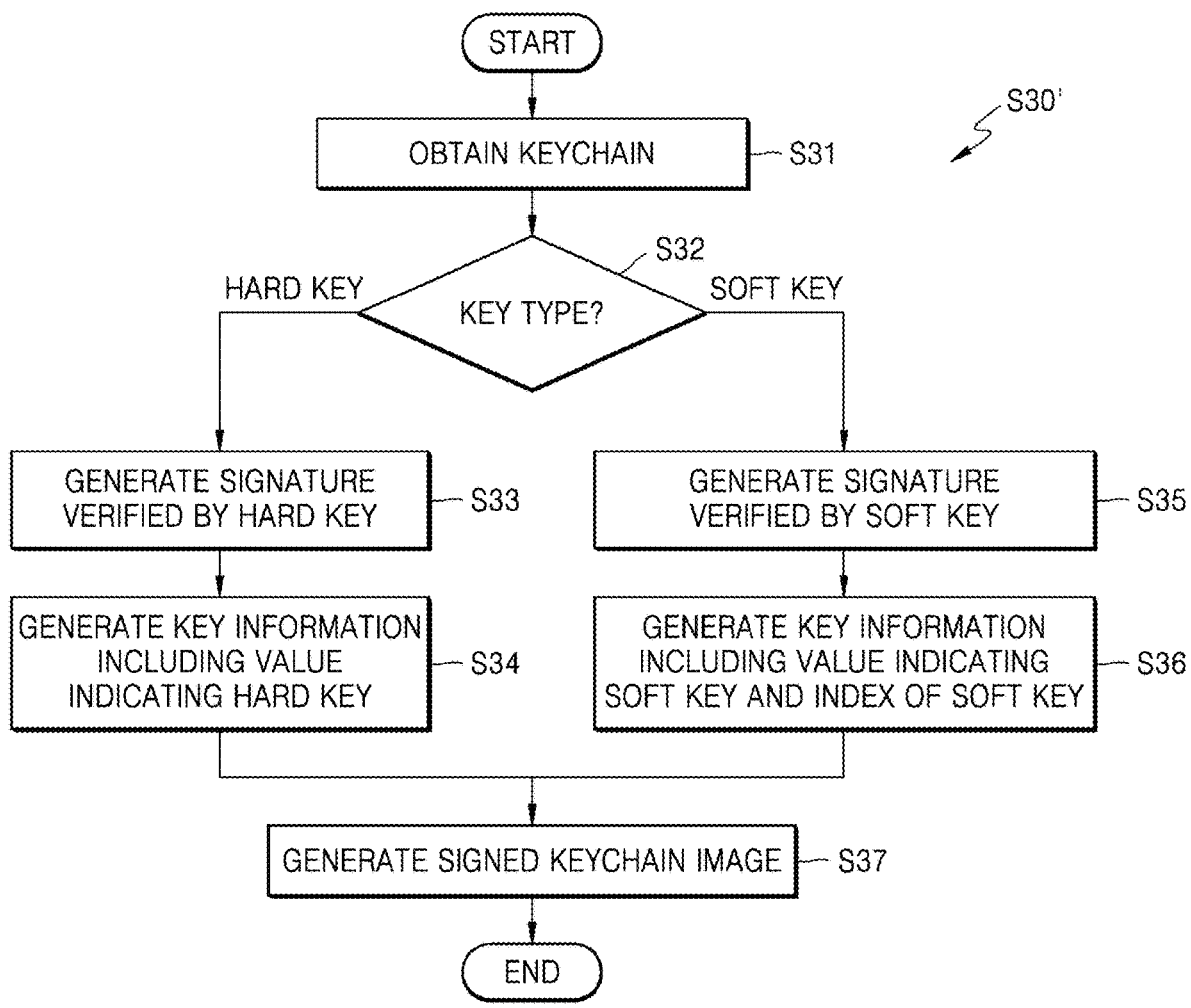
FIG. 14 is a flowchart of a method of authenticating software, according to at least one example embodiment.

FIG. 14 is a flowchart of a method of authenticating software, according to at least one example embodiment. Specifically, the flowchart of FIG. 14 illustrates an example of operation S30 of FIG. 12, but the example embodiments are not limited thereto. As described above with reference to FIG. 12, an operation of generating a signed keychain image may be performed in operation S30' of FIG. 14, but the example embodiments are not limited thereto. As shown in FIG. 14, operation S30' may include a plurality of operations S31 to S37, but the example embodiments are not limited thereto. Hereinafter, the flowchart of FIG. 14 will be described with reference to FIG. 11, and the same aspects which were previously described with reference to FIG. 13 will be omitted in FIG. 14.

In operation S31, an operation of obtaining a keychain may be performed. For example, the image signing system 110 may generate a keychain KCH including at least one soft key therein as shown in FIG. 11, or receive the keychain KCH from the outside (e.g., an external source, etc.), but the example embodiments are not limited thereto.

In some example embodiments, operations S32 to S36 of FIG. 14 may be respectively the same as operations S12 to S16 of FIG. 13, but the example embodiments are not limited thereto. Thus, a program image may have the same structure as a keychain image except for data (i.e., a binary image BIN or the keychain KCH) included therein.

In operation S37, an operation of generating the signed keychain image may be performed. For example, the signed image generator 118 may generate a signed keychain image including the keychain KCH, key information, and a digital signature SIG, etc.

Various operations of the methods described above with reference to the drawings may be performed by an arbitrary appropriate unit capable of performing operations, for example, various hardware or software component(s) executed by hardware circuitry, specially designed circuits, and/or specially designed module(s), etc. Software may include a series of executable computer readable instructions for embodying logical functions. The software may be used by an instruction execution system, apparatus, or device (e.g., a single-core or multi-core processor or a processor-containing system) or be implemented in an arbitrary "processor-readable medium" related thereto.

Operations and blocks of a method or algorithm and functions, which have been described with reference to the example embodiments, may be directly implemented as a hardware, a software module executed by hardware (e.g., a processor, processing circuitry, etc.), or a combination thereof. When the operations and the blocks of the example embodiments are implemented as software, the functions may be stored as at least one computer readable instruction or code on a non-transitory computer-readable recording medium or transmitted. The software module may be in a storage medium of an arbitrary type.

While various example embodiments of the inventive concepts have been particularly shown and described with reference to the example embodiments thereof, it will be understood that various changes in form and details may be made therein without departing from the spirit and scope of the following claims.

What is claimed is:

1. A system comprising:
a system memory configured to store at least one software image, the at least one software image comprising at least a keychain image associated with the at least one software image, the keychain image including at least one soft key associated with the at least one software image, the at least one soft key being a public key corresponding to the at least one software image; and
processing circuitry including at least one hard key, the at least one hard key including a unique value associated with the processing circuitry, the processing circuitry configured to,
read key information included in the at least one software image, the key information including a value indicating a key type, and the key type indicating to authenticate the at least one software image using one of the at least one hard key or the at least one soft key,
select only the at least one hard key to authenticate the at least one software image in response to the key type indicating an authenticate the at least one software image using the at least one hard key,
select only the at least one soft key to authenticate the at least one software image in response to the key type indicating to authenticate the at least one software image using the at least one soft key,
obtain a desired soft key from the keychain image in response to selecting the at least one soft key or obtain a desired hard key from the processing circuitry in response to selecting the at least one hard key, and
authenticate the at least one software image based on the obtained soft key or the obtained hard key.

2. The system of claim 1, wherein the processing circuitry comprises read-only memory configured to store the at least one hard key.

3. The system of claim 2, wherein the processing circuitry is configured to authenticate the keychain image based on the at least one hard key based on the key information.

4. The system of claim 2, wherein the processing circuitry comprises a secure memory configured to store a plurality of hard keys, the plurality of hard keys including the at least one hard key.

5. The system of claim 2, wherein the processing circuitry is configured to obtain the at least one hard key from a second software image loaded in the system memory.

6. The system of claim 2, wherein the processing circuitry is configured to:
identify a desired hard key associated with the at least one software image, from among a plurality of hard keys, the plurality of hard keys including the at least one hard key, based on the key information; and
authenticate the at least one software image based on the desired hard key.

7. The system of claim 1, wherein the processing circuitry is configured to authenticate the at least one software image by verifying a digital signature included in the at least one software image based on the obtained soft key.

8. The system of claim 1, wherein the processing circuitry is configured to identify the desired soft key associated with the at least one software image in the keychain image based on a key index included in the key information.

9. The system of claim 1, wherein
the system memory is configured to store a plurality of keychain images, the plurality of keychain images including a plurality of soft keys; and
the processing circuitry is configured to obtain the desired soft key from the plurality of soft keys based on the key information.

10. The system of claim 1, further comprising:
a system storage device configured to store a plurality of software images, the plurality of software images including the at least one software image, and
wherein the processing circuitry is configured to load the at least one software image from the system storage device into the system memory.

11. A method of authenticating software images loaded in a system memory, wherein the method is performed by processing circuitry, the processing circuitry including at least one hard key, the at least one hard key including a unique value associated with the processing circuitry, the method comprising:
authenticating a first software image, the first software image including first key information and at least one soft key associated with the first software image, the at least one soft key being a public key corresponding to the first software image; and
authenticating a second software image, the second software image including second key information, the authenticating of the second software image including,
obtaining the second key information from the second software image,
reading the second key information, the second key information including a value indicating a key type, and the key type indicating to authenticate the second software image using one of a first hard key or a first soft key, selecting only the first hard key to authenticate the second software image in response to the key type indicating to authenticate the second software image using the first hard key,
selecting only the first soft key to authenticate the second software image in response to the key type indicating to authenticate the second software image using the first soft key, and
verifying a digital signature of the second software image based on the selected first soft key or the selected first hard key.

12. The method of claim 11, wherein the authenticating of the first software image comprises:
obtaining the first key information from the first software image;
obtaining the first hard key included in the processing circuitry based on the first key information; and
verifying a digital signature of the first software image based on the obtained first hard key.

13. The method of claim 11, further comprising:
authenticating a third software image, the third software image including third key information, the third key information being different from the second key information; and
wherein the authenticating of the third software image includes,
obtaining the third key information from the third software image,
obtaining a second soft key from the first software image based on the third key information, the second soft key being different from the first soft key; and
verifying a digital signature of the third software image based on the second soft key.

14. The method of claim 11, further comprising:
authenticating a fourth software image, the fourth software image including fourth key information; and
wherein the authenticating of the fourth software image includes,
obtaining the fourth key information from the fourth software image,
obtaining a third soft key from the authenticated second software image based on the fourth key information, and
verifying a digital signature of the fourth software image based on the third soft key.

15. The method of claim 11, wherein the second key information includes a key index for identifying the first soft key from the at least one soft key included in the first software image.

16. A method of generating a signed software image to execute authentication of software in a system, the system including processing circuitry, the method comprising:
generating a program image as the signed software image, the program image to be executed by the system; and
generating a keychain image as the signed software image, the keychain image including key information and at least one soft key associated with the signed software image, the key information including a value indicating a key type, the at least one soft key being a public key corresponding to the signed software image, the generating the program image including,
obtaining a first binary image, the first binary image including computer readable instructions,
generating a first signature, the first signature being verified based on one of a first soft key or a first hard key included in processing circuitry, the value indicating the key type indicating to select one of the first soft key or the first hard key to verify the first signature, the first hard key including a unique value associated with the processing circuitry, and wherein
only the first hard key is selected to verify the first signature in response to the value indicating the key type indicating to verify the first signature using the first hard key, and
only the first soft key is selected to verify the first signature in response to the value indicating the key type indicating to verify the first signature using the first soft key, and
generating a first signed program image, the first signed program image including the first binary image and the first signature.

17. The method of claim 16, wherein the generating of the first signed program image comprises generating the key information including a first key type value indicating use of a soft key or a hard key for authentication, and a first key index identifying the first soft key from a plurality of soft keys.

18. The method of claim 16, wherein the generating of the keychain image comprises:
obtaining the first hard key included in the processing circuitry;
obtaining a first keychain, the first keychain including the first soft key;
generating a second signature, the second signature being verified based on the first hard key; and
generating a first signed keychain image, the first signed keychain image including the first keychain and the second signature.

19. The method of claim 16, wherein the generating of the program image further comprises:
obtaining the first hard key included in the processing circuitry;
obtaining a second binary image, the second binary image including computer readable instructions;
generating a third signature, the third signature being verified based on the first hard key; and
generating a second signed program image, the second signed program image including the second binary image and the third signature.

20. The method of claim 16, wherein the generating of the keychain image comprises:
obtaining a second soft key;
obtaining a second keychain, the second keychain including the second soft key;
generating a fourth signature, the fourth signature being verified based on the second soft key; and
generating a second signed keychain image, the second signed keychain image including the second keychain and the fourth signature.

* * * * *